Aug. 30, 1960     F. B. BURT     2,950,599
MULTIPLE WINDSHIELD WIPER CONTROL

Filed Feb. 13, 1957     2 Sheets-Sheet 1

INVENTOR.
FARLOW B. BURT.
BY
*William N. Antonis*
ATTORNEY.

United States Patent Office 2,950,599
Patented Aug. 30, 1960

2,950,599

MULTIPLE WINDSHIELD WIPER CONTROL

Farlow B. Burt, South Bend, Ind., assignor to The Bendix Corporation, a corporation of Delaware Filed Feb. 13, 1957, Ser. No. 640,037

11 Claims. (Cl. 60—52)

This invention relates to hydraulic windshield wipers and more particularly to a control system for imparting motion to and synchronizing the motions of two or more windshield wipers.

An object of this invention is to provide a simple windshield wiper control for two or more wipers each of which is driven by a separate hydraulic motor.

Another object of this invention is to provide a hydraulically operated windshield wiper system controlled by a solenoid valve and electrical switch mechanisms.

A further object of this invention is to provide means for synchronizing the movement of two or more windshield wipers, each of which is driven by a separate hydraulic motor.

A still further object of this invention is to provide synchronizing means for two or more hydraulically operated motion transmitting members having a solenoid valve for controlling hydraulic pressure acting on all of the motion transmitting members, and electrical switch means actuated by movement of said motion transmitting members for energizing and de-energizing the solenoid.

The above and other objects and features of the invention will become apparent from the following description of the apparatus taken in connection with the drawings which form a part of this invention and in which.

The windshield wiper control system as described herein is adapted to be hydraulically operated and electrically controlled. The hydraulic pressure may be derived from a central hydraulic system and the electrical power from an electrical source such as the car battery.

Figure 1:
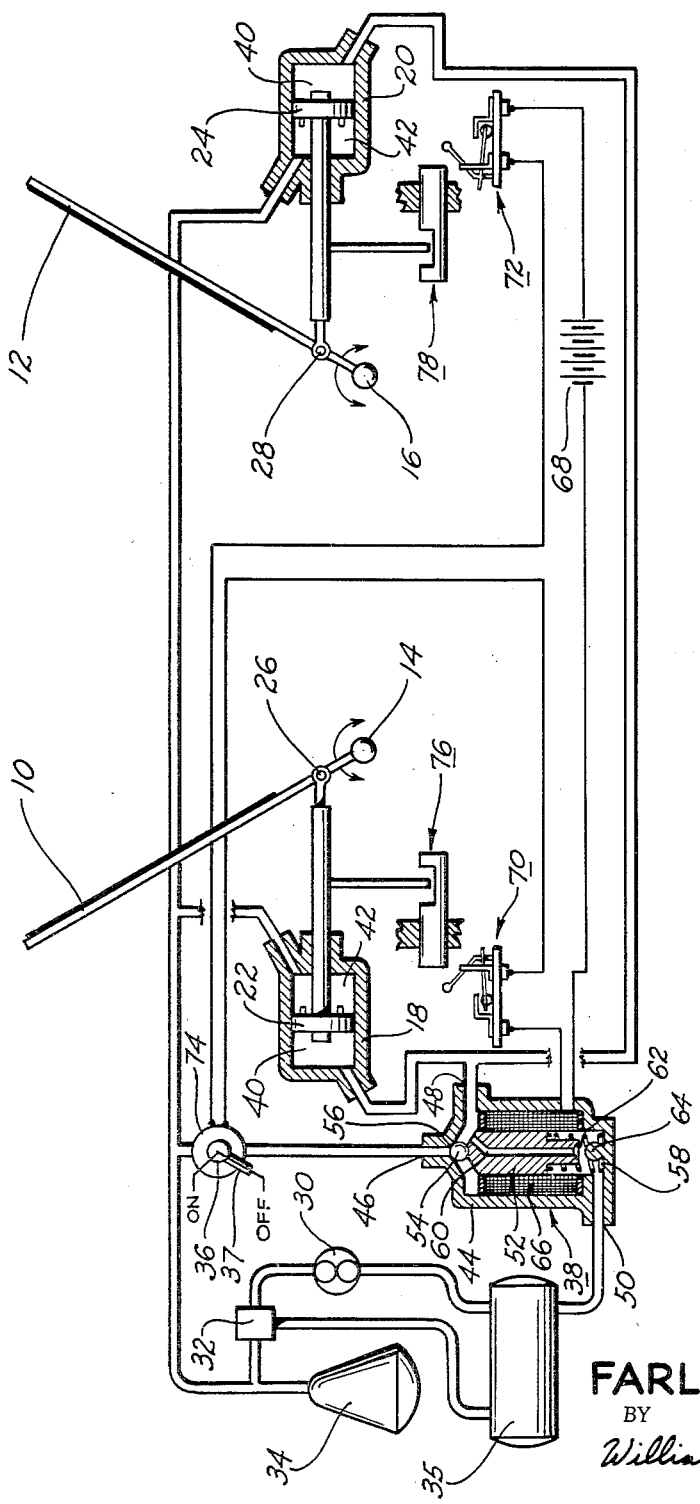
Figure 1 is a schematic illustration of the windshield wiper apparatus shown in connection with the hydraulic and electrical circuit therefor.

Referring to Figure 1 of the drawings, numerals 10 and 12 designate windshield wipers for a vehicle, each having one end pivotally connected at 14 and 16 to a fixed portion of the vehicle. Power cylinders 18 and 20, which are also connected to a fixed portion of the vehicle, have piston members 22 and 24 reciprocable therein, said pistons being connected to wipers 10 and 12 at 26 and 28 for operating the wipers. The power cylinders are a part of a hydraulic system which includes a pump 30, a regulating valve 32, an accumulator 34, a reservoir 35, a manually operated valve 36, a solenoid valve 38, and the requisite pipe lines which convey fluid pressure to chambers 40 and 42 of both power cylinders. The manually operated valve 36 and the solenoid operated valve 38 control the flow of fluid to chambers 40 of both power cylinders, said chambers being adjacent the large area side of pistons 22 and 24. The chambers 42 of both power cylinders are in constant communication with accumulator pressure. The manually operated valve 36 may be of a conventional type capable of completely cutting off fluid pressure to the chambers 40 of the power cylinders or regulating the fluid pressure up to a maximum pressure at which time the valve will be completely open. This manually operated valve, which is regulated by a manual control 37, therefore, will have the function of starting and stopping the wipers and of regulating their speed. The solenoid valve, as schematically shown, comprises a valve body 44 having an inlet port 46, cylinder port 48, and return port 50. An armature 52 having a spherical valve member 54 welded thereto is seatable on a valve seat 56 formed in said valve body. A spring 58 of sufficient strength to overcome the accumulator pressure urges the valve member against valve seat 56. A passage 60 is formed in the armature for communicating the cylinder port 48 with the return port 50 and a valve seat 62 is formed at the end of the passage for seating on a valve member 64 welded to the valve body, thereby cutting off communication between the cylinder port and return port when energization of solenoid 66 causes the armature to overcome spring 58. A solenoid valve of the type shown in Wisman application 597,923, filed July 16, 1956, may also be used in place of the solenoid valve shown.

The supply of current from car battery 68 to the solenoid 66 is controlled by an electrical circuit which includes two single pole single throw snap action switches 70 and 72 wired in series with an electrical switch 74 having contacts adapted to close the electrical circuit upon rotary movement of manual control 37. Snap action switches 70 and 72 are actuated by lost motion push-pull actuating mechanisms 76 and 78 which are operatively connected to pistons 22 and 24.

Operation of the wiper mechanism is as follows: When the manual control is in an "off" position, electrical switch 74 will be in an open position and the valve 36 will be in a closed position. While the manual control 37 remains in this "off" position, chambers 40 of each of the power cylinders communicate with the reservoir 35 via passage 60 of solenoid valve 38 and chambers 42 of each of the power cylinders communicate directly with accumulator 34. Consequently, at this time, piston 22 will come to rest at an extreme left position in power cylinder 18 and piston 24 will come to rest at an extreme right position in power cylinder 20. Movement of the pistons to these positions will have caused actuating mechanisms 76 and 78 to close snap action switches 70 and 72 respectively. When the manual control 37 is rotated to its "on" position, the valve 36 will be caused to open and electrical switch 74 caused to close, thereby energizing solenoid valve 38, since snap action switches 70 and 72 are already closed. Energization of the solenoid causes valve member 54 to unseat from valve seat 56 and valve seat 62 to seat on valve member 64, thereby establishing communication between chambers 40 of each of the power cylinders and accumulator 34. When this occurs, the equal pressures in chambers 40 and 42 acting against differential areas of pistons 22 and 24 cause piston 22 to move towards the right and piston 24 to move towards the left. Continued movement in these directions causes the opening of snap action switches 70 and 72, thereby de-energizing the solenoid valve. Upon de-energization of the solenoid valve, valve seat 62 unseats from valve member 64 and valve member 54 seats on valve seat 56. Chambers 40 are therefore once again communicated with reservoir 35 and pistons 22 and 24 reverse their direction of movement. This cycle is repeated over and over again as a result of the actuation of snap action switches 70 and 72 which control the energization and de-energization of the solenoid valve 38. Since both snap switches 70 and 72 are in series, it necessarily follows that both switches must be closed in order for the solenoid to become energized. As a result, if one of the pistons completes its stroke first and consequently closes its associated switch first, this piston will not reverse its direction of motion but must wait until the other switch is closed by the other piston at which time both pistons will reverse their direction of movement simultaneously. On the reverse stroke, however, the release of both snap switches is not necessary to reverse the direction of the pistons, since the release of only one of the snap switches breaks the circuit thereby de-energizing the solenoid. Therefore, the release of one of the snap switches by one of the pistons causes both pistons to reverse directions even though the other piston has not released its associated snap switch. In effect, therefore, synchronization takes place only at the "retraction end" of each cycle. Turning of the manual control 37 to the "off" position opens switch 74 de-energizing solenoid valve 38, if it is not already in a de-energized position of the cycle, thereby always causing piston 22 to come to rest in its extreme left position and piston 24 in its extreme right position. The reciprocating speed of pistons 22 and 24 can be regulated through manual control 37 by turning it to the desired points between the "on" and "off" positions.

Figure 2:
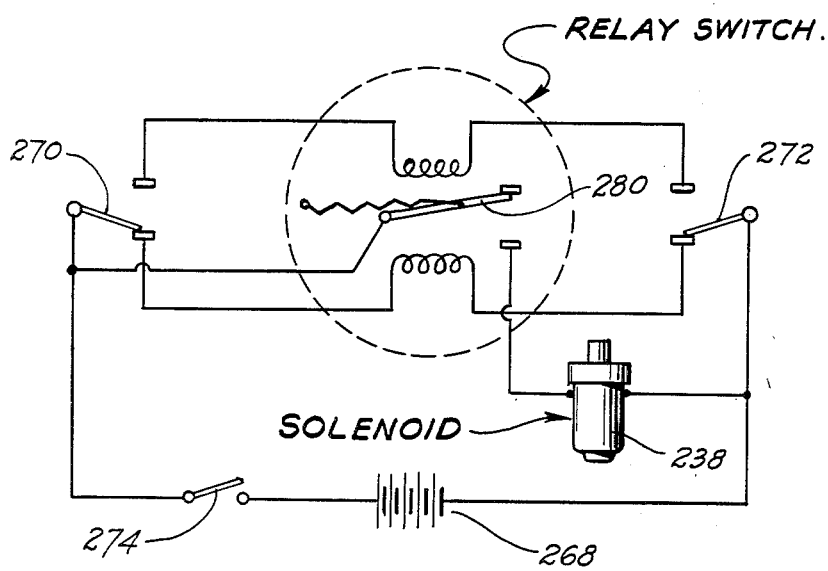
Figure 2 is a diagrammatic illustration of another electrical circuit which may be used in place of the electrical circuit shown in Figure 1.

Figure 2 shows an alternate electrical circuit which may be used in place of the electrical circuit shown in Figure 1. The hydraulic system, solenoid, and switch actuating means will remain essentially the same. In this figure like components are designated by like numerals plus 200. The principal difference between the electrical circuits of Figures 1 and 2 is that in Figure 2 two single pole double throw switches 270 and 272 are used in conjunction with a relay switch 280 in place of single pole single throw switches 70 and 72 of Figure 1. By using this particular type of electrical circuit, it is possible to provide synchronization of the wiper blades at the end of each cycle and half cycle, instead of only each cycle, since movement of both S.P.D.T. switches must occur before the solenoid 238 will be energized or de-energized.

Thus, looking at Figure 2, it will be seen that the closing of manual switch 274, which is shown on the drawing in an open or "off" position, will cause the relay switch to move to its opposite pole thereby energizing solenoid 238. Energization of the solenoid will communicate fluid pressure to the large area side of each piston causing them to move until both pistons have actuated their associated switches 270 and 272 to move to their opposite poles. Movement of both switches to their opposite poles causes relay switch 280 to move back to the position shown in Figure 2, thereby de-energizing the solenoid. De-energization of the solenoid results in communicating the large area side of each piston with the reservoir thereby causing a reversal of the direction of movement of each piston until each piston has actuated their associated switches 270 and 272 to return to the poles shown in Figure 2, at which time the cycles will be repeated over and over until manual switch 274 is opened.

Figure 3:
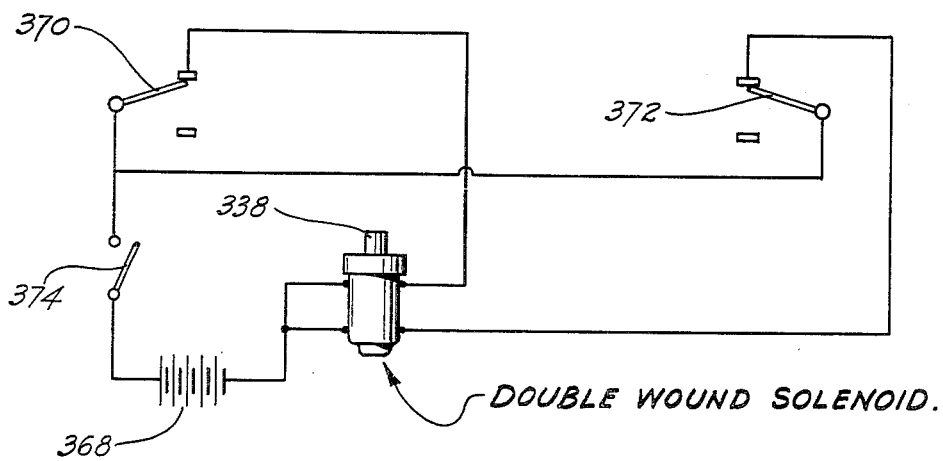
Figure 3 is a diagrammatic illustration of a third electrical circuit which may be used in place of the electrical circuit shown in Figure 1.

Figure 3 shows another alternate electrical circuit which may be used in place of the electrical circuit shown in Figure 1 in order to provide synchronization at the end of each cycle and half cycle instead of only each cycle. The same hydraulic and electrical system shown in Figure 1 will be used, except that a double wound solenoid is used instead of the single wound solenoid shown in Figure 1. In Figure 3 like components are designated by like numerals plus 300. The solenoid valve of Figure 3 will be essentially the same as the one shown in Figure 1 except for the necessary double winding. In order to achieve the desired synchronization the windings of the solenoid 338 are designed so that current through both windings will be necessary to move the armature and valve element initially, but after movement has occurred only one energized winding will be sufficient to retain the valve element in the moved position. Piston actuated S.P.S.T. switch 370, therefore, will be connected in series with manual switch 374, car battery 368, and one of the windings of solenoid valve 338. Piston actuated switch 372, will be connected in series with manual switch 374, car battery 368, and the other of the windings of solenoid valve 338. Since both windings of solenoid 338 must be energized or de-energized to cause the solenoid valve to open or close, both piston actuated switches 370 and 372 must be closed or open. Thus if one of the pistons closes its associated switch before the other piston does, the pistons will not reverse their direction until the other piston also closes its associated switch. Likewise, if one of the pistons opens its switch before the other piston does, the pistons will not reverse their direction until both switches are open. Consequently, synchronization will occur at each end of the cycle.

Although my invention has been described in connection with certain specific embodiments, the principles are susceptible to numerous other applications that will readily occur to persons skilled in the art.

Having thus described the various features of my invention, what I claim as new and desire to secure by Letters Patent is:

1. A control system for continuously synchronizing two oscillating members comprising means for producing hydraulic pressure, two motion transmitting elements connected to said members and actuated in one of two directions by pressure from the hydraulic pressure producing means acting thereon in both directions, means for conveying fluid from said pressure producing means to said motion transmitting elements, manually operable valve means and electrically operable valve means in said second mentioned means for controlling the pressure acting against said motion transmitting elements in one of said two directions, a source of electrical energy, conductor means interconnecting said electrically operable valve means and the source of electrical energy, a first switch mechanism electrically connected to said conductor means and operatively connected to said manually operable valve means for energizing said electrically operable valve means upon opening of said manual valve means, a second switch mechanism electrically connected to said conductor means and operatively connected to one of said motion transmitting elements, and a third switch mechanism electrically connected to said conductor means and operatively connected to the other of said motion transmitting elements, said second and third switch mechanisms being adapted to energize and de-energize with cyclic recurrence said electrically operable valve means after initial energization of said electrically operable valve means by movement of said manual valve means to a fixed open position.

2. A control system for continuously synchronizing two oscillating members comprising means for producing hydraulic pressure, two motion transmitting elements connected to said members and actuated in one of two directions by pressure from the hydraulic pressure producing means acting thereon in both directions, means for conveying fluid from said pressure producing means to said motion transmitting elements, first and second valves in series in said second mentioned means for controlling the pressure acting against both of said motion transmitting elements in one of said two directions, one of said valves being manually actuated and the other of said valves being power actuated, a source of power for actuating the other of said valves, said manually actuated valve upon actuation simultaneously controlling the flow of power for actuating the other of said valves, control means actuated with cyclic recurrence by each of said motion transmitting elements for controlling the flow of power to the other of said valves after initial actuation of said power actuated valve by movement of said manually actuated valve to a fixed position, and means connecting the other of said valves with the source of power via said control means.

3. A control system for continuously synchronizing two oscillating members comprising means for producing hydraulic pressure, two motion transmitting elements connected to said members and actuated in one of two directions by pressure from the hydraulic pressure producing means acting thereon in both directions, a single valve for controlling pressure acting against both of said motion transmitting elements in one of said two directions, a source of power for actuating said valve, manually actuated valve means for regulating the flow of hydraulic fluid to said first named valve and for simultaneously controlling the flow of power for actuating said first named valve, first snap action means actuated by one of said motion transmitting elements, second snap action means actuated by the other of said motion transmitting elements, said first and second snap action means being effective to cut off or restore with cyclic recurrence the source of power actuating said first named valve after said first named valve is initially actuated by movement of said manually actuated valve means to a fixed position, and means communicating said first named valve with the source of power via said snap action means.

4. A control system for continuously synchronizing two oscillating members comprising means for producing hydraulic pressure, two motion transmitting elements connected to said members and actuated in one of two directions by pressure from the hydraulic pressure producing means acting thereon in both directions, a single solenoid valve for simultaneously controlling pressure acting against each of said motion transmitting elements in one of said two directions, manually actuated valve means for regulating the flow of hydraulic fluid to said solenoid valve, a snap action electrical switch actuated by movement of said manually controlled valve for energizing said solenoid valve, a second snap action electrical switch actuated by one of said motion transmitting elements, a third snap action electrical switch actuated by the other of said motion transmitting elements, said second and third switches controlling with cyclic recurrence energization and de-energization of said solenoid valve after initial energization of said solenoid valve by movement of said manually controlled valve to a fixed position, and an electrical power supply circuit for connecting the solenoid and switches.

5. A control system for synchronizing two oscillating members comprising a source of hydraulic pressure, first and second hydraulic cylinders, a first piston reciprocable in said first cylinder and operatively connected to one of said members, a second piston reciprocable in said second cylinder and operatively connected to the other of said members, means for conveying fluid between the pressure source and both sides of each of said pistons, a manually controlled valve and a solenoid valve in said means for controlling the flow of fluid to one side of each of said pistons, an electrical switch actuated by movement of said manually controlled valve for energizing said solenoid valve, a second electrical switch actuated by movement of said first piston, a third electrical switch actuated by movement of said second piston, said second and third switches controlling with cyclic recurrence energization and de-energization of said solenoid valve after initial energization of said solenoid valve by movement of said manually controlled valve to a fixed position, and an electrical power supply circuit for connecting the solenoid and switches in series.

6. A control system for synchronizing two oscillating members comprising a hydraulic pump, first and second hydraulic cylinders, a first piston reciprocable in said first cylinder and operatively connected to one of said members, a second piston reciprocable in said second cylinder and operatively connected to the other of said members, means for conveying fluid between the pump and both sides of each of said pistons, a solenoid valve in said means for controlling the flow of fluid to one side of each of said pistons, a manually controlled valve in said means for regulating the flow of fluid to said solenoid valve, an electrical switch actuated by movement of said manually controlled valve for energizing said solenoid valve, a second electrical switch associated with said first piston, a third electrical switch associated with said second piston, means connected to each of said pistons for actuating said second and third electrical switches upon movement of said second and third pistons, said switches controlling with cyclic recurrence energization and de-energization of said solenoid valve after initial energization of said solenoid valve by movement of said manually controlled valve to a fixed position, and an electrical power supply circuit connecting the solenoid and switches in series.

7. A control system for synchronizing two oscillating members comprising a source of hydraulic pressure, first and second hydraulic cylinders, a first piston reciprocable in said first cylinder and operatively connected to one of said members, a second piston reciprocable in said second cylinder and operatively connected to the other of said members, means for conveying fluid between the pressure source and both sides of each of said pistons, a source of electrical energy, a manually controlled valve and a solenoid valve in said means for controlling the flow of fluid to one side of each of said pistons, a first electrical switch actuated by movement of said manually controlled valve for energizing said solenoid valve, a second electrical switch actuated by movement of said first piston, a third electrical switch actuated by movement of said second piston, and a relay switch connected in series with said second and third electrical switches and with said solenoid valve, said second and third electrical switches in conjunction with said relay switch being adapted to energize and de-energize said solenoid valve with cyclic recurrence after initial energization of solenoid valve by movement of said manually controlled valve to a fixed position.

8. A control system for synchronizing two oscillating members comprising means for producing hydraulic pressure, two motion transmitting elements connected to said members and actuated in one of two directions by pressure from the hydraulic pressure producing means acting thereon in both directions, means for conveying fluid from said pressure producing means to said motion transmitting elements, a manually controlled valve and a solenoid valve in said second mentioned means for controlling the pressure acting against said motion transmitting elements in one of said two directions, a source of electrical energy, conductor means interconnecting said solenoid valve and the source of electrical energy, a first switch mechanism electrically connected to said conductor means and operatively connected to said manually controlled valve, a second switch mechanism electrically connected to said conductor means and operatively connected to one of said motion transmitting elements, a third switch mechanism electrically connected to said conductor means and operatively connected to the other of said motion transmitting elements, and a relay switch connected in series with said second and third switch mechanisms and with said solenoid valve, said switch mechanisms being adapted to energize and de-energize said solenoid valve.

9. A control system for synchronizing two oscillating members comprising a source of hydraulic pressure, first and second hydraulic cylinders, a first piston reciprocable in said first cylinder and operatively connected to one of said members, a second piston reciprocable in said second cylinder and operatively connected to the other of said members, means for conveying fluid between the pressure source and both sides of each of said pistons, a source of electrical energy, a manually controlled valve and a double wound solenoid valve in said means for controlling the flow of fluid to one side of each of said pistons, a first electrical switch actuated by movement of said manually controlled valve, a second electrical switch actuated by movement of said first piston, said first and second electrical switches being connected in series with said source of electrical energy and one of the windings of said double wound solenoid, a third electrical switch actuated by movement of said second piston, said first and third electrical switches being connected in series with said source of electrical energy and the other of the windings of said double wound solenoid, said electrical switches being adapted to energize and de-energize said solenoid valve.

10. A control system for synchronizing two oscillating members comprising means for producing hydraulic pressure, two motion transmitting elements connected to said members and actuated in one of two directions by pressure from the hydraulic pressure producing means acting thereon in both directions, means for conveying fluid from said pressure producing means to said motion transmitting elements, a manually controlled valve and a double wound solenoid valve in said second mentioned means for controlling the pressure acting against said motion transmitting elements in one of said two directions, a source of electrical energy, conductor means interconnecting said solenoid valve and the source of electrical energy, a first switch mechanism electrically connected to said conductor means and operatively connected to said manually controlled valve, a second switch mechanism electrically connected to said conductor means and operatively connected to one of said motion transmitting elements, said first and second switch mechanisms being connected in series with said source of electrical energy and one of the windings of said double wound solenoid, a third switch mechanism electrically connected to said conductor means and operatively connected to the other of said motion transmitting elements, said first and third switch mechanisms being connected in series with said source of electrical energy and the other of the windings of said double wound solenoid, said switch mechanisms being adapted to energize and de-energize said solenoid valve.

11. A control system for continuously synchronizing two oscillating members comprising a hydraulic pressure source, a reservoir, first and second hydraulic cylinders, a first piston reciprocable in said first cylinder, said first piston being connected to one of said oscillating members, a second piston reciprocable in said second cylinder, said second piston being connected to the other of said oscillating members, means for conveying fluid from the pressure source to both sides of each of said pistons, a single solenoid valve for simultaneously controlling flow of fluid to one side of each of said pistons, said solenoid valve having an inlet port, return port and cylinder port, a manually operable valve for controlling flow of fluid to the inlet port of said solenoid valve, a first electrical switch actuated by movement of said manually operable valve for energizing said solenoid valve, said energization permitting flow of fluid through said solenoid valve to said one side of each of said pistons via said inlet port and cylinder port, a second electrical switch actuated by movement of said first piston, a third electrical switch actuated by movement of said second piston, said second and third switches controlling with cyclic recurrence energization and de-energization of said solenoid valve after initial energization of said solenoid valve by movement of said manually operable valve to a fixed position, said de-energization permitting flow of fluid from said one side of each of said pistons to said reservoir through said solenoid valve via said cylinder port and return port, and an electrical power supply circuit for connecting the solenoid and switches.

References Cited in the file of this patent

UNITED STATES PATENTS

| | | |
|---|---|---|
| 2,270,943 | Freundel et al. | Jan. 27, 1942 |
| 2,581,010 | Findley | Jan. 1, 1952 |
| 2,785,535 | Alcorn | Mar. 19, 1957 |